Figure 1:
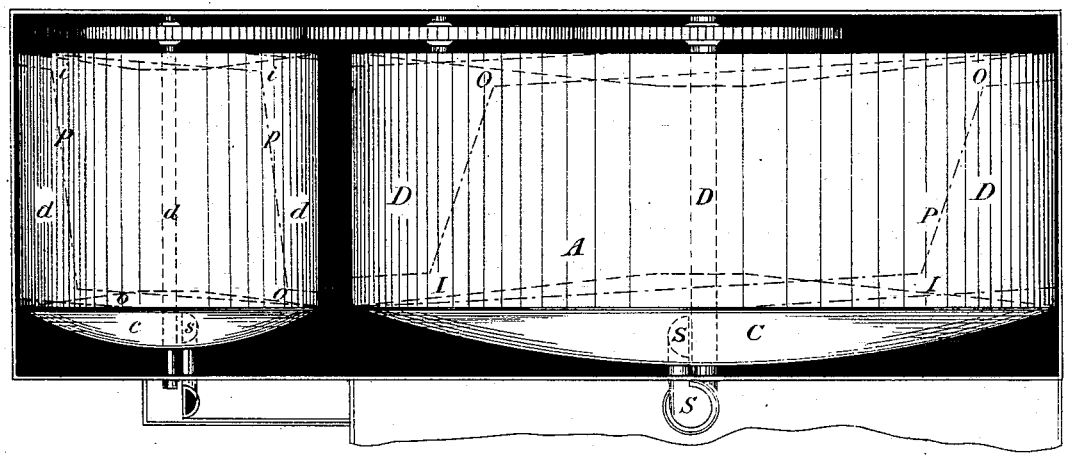

2 Sheets--Sheet 1.

W. J. WARNER & W. COWAN.
Gas-Meters.

No. 157,360.  Patented Dec. 1, 1874.

WITNESSES

INVENTORS

W. J. WARNER & W. COWAN.
Gas-Meters.

No. 157,360.

Patented Dec. 1, 1874.

UNITED STATES PATENT OFFICE.

WILLIAM JOHN WARNER, OF SOUTH SHIELDS, AND WILLIAM COWAN, OF EDINBURGH, NORTH BRITAIN.

IMPROVEMENT IN GAS-METERS.

Specification forming part of Letters Patent No. 157,360, dated December 1, 1874; application filed August 7, 1874.

*To all whom it may concern:*

Be it known that we, WILLIAM JOHN WARNER, gas-engineer, of South Shields, in the county of Durham, and WILLIAM COWAN, gas-meter manufacturer, of Edinburgh, in the county of Mid-Lothian, North Britain, in the United Kingdom of Great Britain, have invented Improvements in Gas-Meters, of which the following is a specification:

The measuring drum, wheel, or cylinder of a wet-meter, as ordinarily constructed, is more or less affected by the variation of the water-line, the rising of it lessening the capacity, and the lowering of it increasing the capacity, which arises from the measurer in action being but an annulus, by the water being above the axes of the wheel; hence the variation. A portion of all wheels around the axis is constantly immersed in the water, and thus the measuring portion of the wheel in action becomes an annulus, varying as the center or dead portion of the wheel varies by the changes in the water-level.

Our improvements consist in the construction of a wheel with an inner wheel, of a little larger diameter than the dead portion of the wheel, within which the fluctuations in capacity of the combined wheels may take place, by which means perfect accuracy is practically attained, with considerable variation in the water-line and an increased range of float.

In one form we place within the ordinary wheel an inner wheel of the same make as the ordinary wheel, but with its inlets at the back of the measuring-wheel, and its outlets opening into the measuring chambers or quarters of the wheel. The radius of the inner wheel is a little more than the distance of the highest water-line above the axis of the meter. The small wheel, therefore, nearly corresponds with the internal dead portion of the ordinary wheel, and the depth of the wheel is that of half, or about half, the depth of the ordinary wheel. Now, as the inlets of this inner wheel are open to the case and common outlet of the major or measuring wheel, it will be seen that, as the major wheel revolves, the smaller chambers must be filled with measured gas, and as the outlets open into the large chambers of the measuring-wheel, as they are filling, there must be at each revolution of the wheel a quantity of gas brought back from the measured portion equal to the capacity of the inner wheel, and as this varies with, and is in the same ratio and directly as, the variable portion of measures of major wheel, there will be no practical variation in the measurement by variation of the water-line. In another form the small wheel is placed in the front part of the ordinary wheel, immediately under the cover. In this form the inlets of small wheel are within the chambers of major wheel, and the smaller wheel discharges its gas into the cover.

The construction of the chambers of the small wheel is the opposite to that of the usual wheel of ordinary construction, the gas being made to pass through the small one from the back to the front, the inlet-hoods (having no hollow cover) being thus placed at the back, and the outlet-hoods at the front, of this wheel. The diameter of the small wheel must be such that the hoods may be always sufficiently above the water to insure the compensating action of this wheel. There being two forms of the combined wheel—one with the ends of the two wheels in nearly the same plane at the back, and the other with the two ends at the front—the depth and diameter of the small wheel depend upon which of the the two forms is adopted.

The combined wheel may be constructed with any convenient number of chambers, and the inner wheel may have a greater number of chambers than the major one, and be made in other forms than that of the ordinary wheel. A wheel may be constructed, too, combining the two forms—that is to say, with two small wheels placed within the major wheel—one with its inlets open to the chambers, and the other with its inlets external to the major wheel.

Instead of the inner or compensating wheel being within and attached to the measuring-wheel, a combination of an ordinary wheel with another of considerably less capacity, constructed in the usual way, the two being coupled together by spur-wheels, or other equivalent mechanical means, may be used for the compensating portion of measured gas, the smaller wheel being driven by the ordinary measuring-wheel at a rate proportionate to the capacity of the compensating-wheel, returning the gas thus from outlet to inlet of meter.

These wheels may also be combined with Esson's or other compensating-meters, with fountains, thus permitting of a greater seal being given to the air-pipe of the fountain.

The principle of this invention will be best understood by a reference to Figure 1, Sheet 1, of drawings attached.

A is the ordinary wet-meter wheel, drum, or cylinder, geared to, and driving in the same direction as itself, through the action of the intermediate or middle spur-wheel, the small wheel or drum B. The construction, it will be seen by the dotted lines, as well as the movement, is the same in both A and B; but the arrangement of the chambers D and the inlets I and outlets O are reversed in B. The passage of gas through this wheel is, therefore, the opposite to that of the other. In A the flow of the gas is from the cover C through the inlets I in front to the outlets O at the back of the wheel; but in B the passage of the gas is from $i$ at the back to $o$ in the front. By the cover C and spout S the wheel is in communication with the common inlet of the meter. The inlets of B, it will be seen, are common to the outlet of the meter. It is, therefore, obvious that, as the measuring-wheel A revolves and discharges its gas into the case of meter, a portion of that gas will be drawn from the outlet and returned to the common inlet by the wheel B. Now, as the depth of this wheel is equal to that of A, and the diameter rather more than that of the water-circle or dead portion, there will be at each entire revolution a volume of gas equal to the gas capacity of the small wheel abstracted from the measured volume of the large wheel, leaving its measuring-capacity practically that of an annulus extending from its periphery to a circle corresponding with the periphery of the small drum. It follows, then, (the two wheels having a common water-line, subject to the difference of pressure in the two wheels,) that any alteration of it will equally affect their capacity, the lowering of the water increasing the capacity of both, that the excess of volume of the larger one will be returned to the common inlet by the correspondingly-increased capacity of the small wheel; hence practically-correct measurement is obtained with considerable variation of water-line.

Several arrangements of these combined wheels may be made. The two may be coupled together with their axes at right angles to each other by the use of bevel-wheels, or they may be worked without the use of the intermediate spur-wheel. In both these cases the wheels would revolve in opposite directions, and hence the common formation of chamber in small wheel would have to be employed for the abstraction of the gas. The two wheels may be placed on one shaft or axis, with the covers $c$ C at the two ends of the shaft, thus using the common form of chamber in the small wheel, the inlets of small wheel being uncovered, and the outlets covered. Or, further, as the small wheel B is but a little more in diameter than the dead portion of the large wheel, a part of this may be cut away without materially lessening its measuring-capacity, and the small wheel placed partly or wholly, except the inlets, within the large one, thus economizing space, work, and material.

Figure 2:
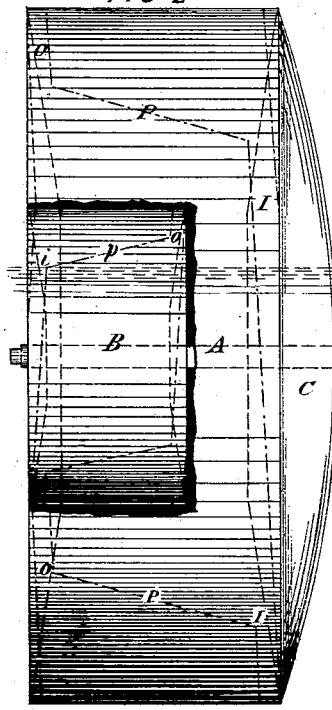

Fig. 2 shows this arrangement.

A is the major or measuring wheel; B, the small or inner wheel, as above explained. The action of this regulates the volume of gas passed to the burners from the major wheel. The inlets of the small wheel $i$ $i$ are nearly in the same plane as the outlets O of major wheel. $i$ and O being open to the outlet portion of case of meter, each outlet $o$ of inner wheel opens and discharges the gas from its chamber into a chamber of major wheel, while filling, as the same revolves. Hence there is no necessity for a cover over the outlets of inner wheel, or a spout and return-pipe, as shown in Fig. 1.

It need scarcely be added that the partitions P of major wheel and the quarters and outlet hoods are soldered to the inner wheel, and made sound in the usual way, so as to form the four measuring-chambers of the wheel.

The quantity of gas discharged at each revolution is practically the contents of the annulus bounded by a circle corresponding with the periphery of the small drum, because the gas contained between the water-line and that point (in the portion of large drum which the small one does not occupy) passes into the latter, and is returned under the cover to be remeasured along with the supply entering by the spout. It follows that any alteration of the water-level will affect both drums equally, and make no practical difference in the quantity of gas passed.

Figure 3:
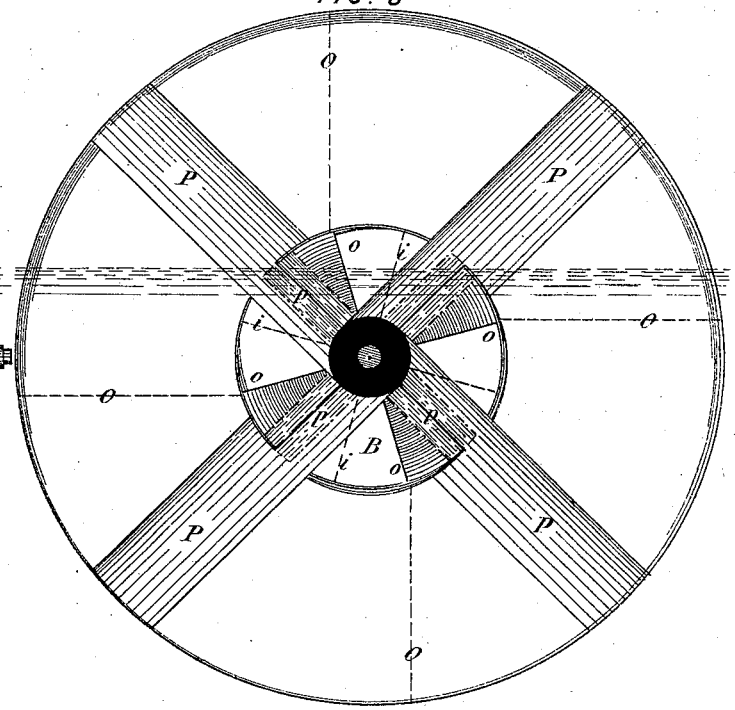
Figure 4:
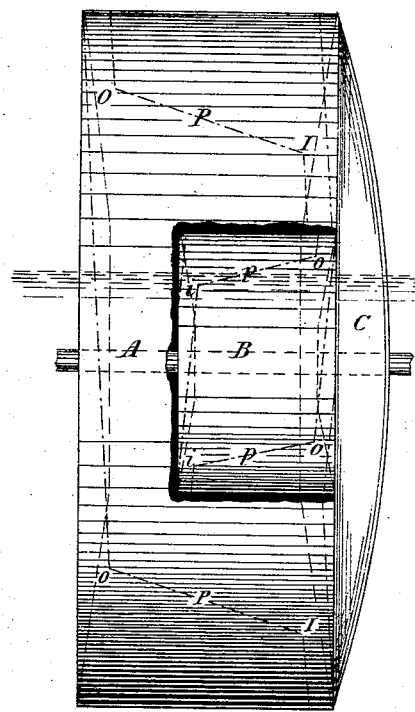
Figure 5:
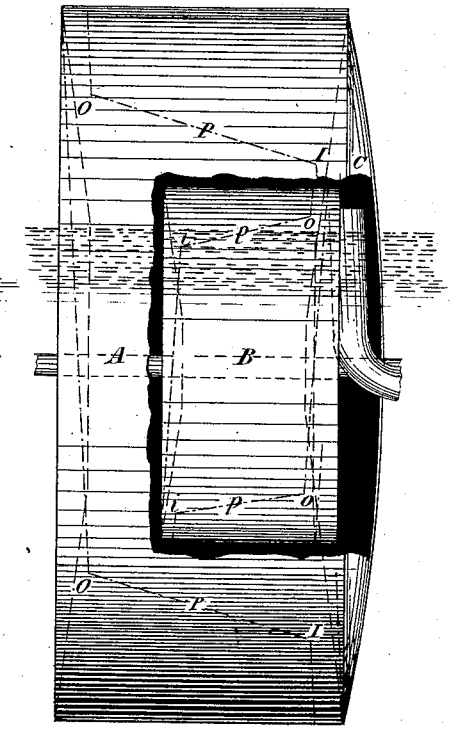

Fig. 3 shows the major wheel, with cover C and front quarters removed, by which a front view of the combined wheels is obtained. Fig. 4 is a modification of the principle. The inner wheel is placed at or near the front of the major wheel, the inlets $i$ $i$ being placed within the chambers of major wheel, the gas being discharged from the inner wheel through the outlets O into the cover-chamber C. Fig. 5 is an arrangement by which the capacity of measuring-wheel may be increased without increasing the size of meter.

The major wheel is made deeper by the convexity of the cover C being considerably reduced. Space for the spout S is obtained by placing the front quarters of inner wheel some little distance back in its rim.

In Figs. 2 and 3 the inner wheel should be rather more than half the depth of major wheel, and of sufficient diameter for the water to be no higher than the junction of the partitions with the inner wheel, as shown by water-line. The depth of the wheel being rather more than half the depth of major wheel, some allowance is made for the difference in capacity that would otherwise arise in the same sections of wheels from the difference in pressure at inlet and outlet by the action of meter, the chambers of major wheel in filling being subjected to inlet pressure, but of the inner wheel to the outlet pressure.

It will be understood that a perfectly-accurate equivalent volume with every change of water-line is not attempted to be withdrawn.

With Figs. 4 and 5 the gas may be made to simply pass through the inner wheel. The inlets being subjected to the inlet pressure only, in this case its diameter may be less than the other arrangement, and its depth should be as great as can be conveniently allowed; but it will be understood that we do not confine ourselves exactly to any of the proportions given, and it may be found advantageous to make the inner wheels of greater diameters than those specified. The two arrangements of wheels may be combined—that is to say, an inner wheel with its inlets external to major wheel, and another inner wheel with its inlets internally arranged in major wheel, and its outlets delivering into cover-chamber.

Figure 6:
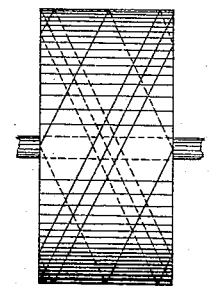
Figure 7:
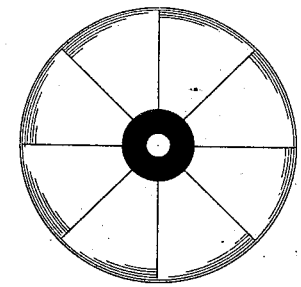

In Fig. 2 the inlets $i$ of inner wheel are not placed coincident with the partitions P, in order that the construction may be better seen; but in wheels of Fig. 5, which is the form we prefer using, the edges of the inlet-hoods are placed as close as possible to the edges of partitions to which the inner wheel is attached. If placed in advance of partition, as shown in Fig. 3, the full measure of variable volume in major wheel will not be taken out, and, if placed behind it, unmeasured gas alone will pass through the inner wheel to and from the cover-chamber C. In the latter case a fan form of wheel, as shown at Figs. 6 and 7, may be employed as an inner wheel.

The adjustment of the registration will be most conveniently made by changing the relative rates of wheels in the index.

The same letters refer to the same parts in all the drawings above described.

The only alteration required in a fountain-meter to increase its efficiency by its adaptation to the improved wheel is to lengthen the gas or air tube, the bottom end being thus immersed to a greater depth in the water with the same water-line, the seal thereby being considerably increased, to the range, or nearly so, of variation of water-line of wheel, whereby the stability of the action of the fountain is improved, and the efficiency of the meter materially increased.

We claim—

In combination with the main wheel, the auxiliary wheel or chamber, adapted to return a certain amount of gas to the inlet-opening of the main wheel, this amount being greater or less as a greater or less amount is delivered to the main wheel, as described.

W. J. WARNER.
WILLIAM COWAN.

Witnesses:
W. H. BENNETT,
WATSON CHAPMAN.